(12) United States Patent
de Bie et al.

(10) Patent No.: US 12,233,778 B2
(45) Date of Patent: Feb. 25, 2025

(54) TRANSPARENT ROOF PANEL ASSEMBLY FOR A VEHICLE ROOF

(71) Applicant: INALFA ROOF SYSTEMS GROUP B.V., Oostrum (NL)

(72) Inventors: Sander de Bie, Nuth (NL); Theodorus van Doleweerd, Budel-Dorplein (NL); Ruud Geurts, Helden (NL); Marcel Johan Christiaan Nellen, Merselo (NL); Christian Giese, Goch (DE)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 0 days.

(21) Appl. No.: 18/326,346

(22) Filed: May 31, 2023

(65) Prior Publication Data
US 2024/0109482 A1    Apr. 4, 2024

(30) Foreign Application Priority Data
Sep. 29, 2022  (EP) .................................. 22198890

(51) Int. Cl.
  *B60Q 3/208*  (2017.01)
  *B62D 25/06*  (2006.01)
(52) U.S. Cl.
  CPC ............. *B60Q 3/208* (2017.02); *B62D 25/06* (2013.01)
(58) Field of Classification Search
  CPC .......................... B60Q 3/208; B62D 25/06–07
  See application file for complete search history.

(56) References Cited

U.S. PATENT DOCUMENTS

| 5,613,751 A | 3/1997 | Parker et al. |
| 5,618,096 A | 4/1997 | Parker et al. |
| 5,876,107 A | 3/1999 | Parker et al. |

(Continued)

FOREIGN PATENT DOCUMENTS

| CN | 112677880 A | 4/2021 |
| DE | 202014104932 U1 | 1/2015 |

(Continued)

OTHER PUBLICATIONS

Partial Search Report in corresponding European patent application No. 22198890.0 dated Mar. 23, 2023.

(Continued)

*Primary Examiner* — Jason M Han
(74) *Attorney, Agent, or Firm* — Steven M. Koehler; Westman, Champlin & Koehler, P.A.

(57) ABSTRACT

A transparent roof panel assembly for an opening in a vehicle roof comprises a panel having a transparent area that allows visible light to pass through between an exterior and an interior of the vehicle. A light source is arranged to provide light in the panel. An in-coupling element couples light into the panel from the interior side of the panel, the in-coupling element being attached to the interior side of the panel and redirecting light from the light source into the panel. The in-coupling element may be partly covered towards the interior of the vehicle, with the exception of a selected area, such that light is able to pass from the in-coupling element towards the interior through the selected area. The in-coupling element is attached to the interior side of the panel by an adhering material accommodated in a chamber formed between the in-coupling element and the panel.

16 Claims, 6 Drawing Sheets

(56) References Cited

U.S. PATENT DOCUMENTS

| | | |
|---|---|---|
| 5,921,652 A | 7/1999 | Parker et al. |
| 6,079,838 A | 6/2000 | Parker et al. |
| 10,661,641 B2 * | 5/2020 | Thannheimer ....... G02B 6/0046 |
| 2008/0259640 A1 | 10/2008 | Parker |
| 2008/0259642 A1 | 10/2008 | Parker |
| 2008/0266899 A1 | 10/2008 | Parker |
| 2009/0027920 A1 | 1/2009 | Parker |
| 2009/0034234 A1 | 2/2009 | Parker |
| 2009/0073719 A1 | 3/2009 | Parker |
| 2009/0257244 A1 | 10/2009 | Parker |
| 2011/0051458 A1 | 3/2011 | Parker |
| 2012/0081919 A1 | 4/2012 | Parker |
| 2012/0081921 A1 | 4/2012 | Parker |
| 2013/0213929 A1 | 8/2013 | Ouderkirk et al. |
| 2019/0001875 A1 | 1/2019 | Xu et al. |
| 2020/0241189 A1 | 7/2020 | Schabacker et al. |
| 2020/0384740 A1 | 12/2020 | Berard et al. |
| 2021/0170724 A1 | 6/2021 | Hennion et al. |
| 2021/0354622 A1 | 11/2021 | Spazier |
| 2023/0118480 A1 | 4/2023 | Pasquarelli |

FOREIGN PATENT DOCUMENTS

| | | | |
|---|---|---|---|
| DE | 202018103669 U1 | 7/2018 | |
| DE | 102018008228 A1 | 4/2020 | |
| DE | 102020101813 A1 | 7/2020 | |
| DE | 102020109338 B3 * | 5/2021 | ....... B32B 17/10018 |
| EP | 1791010 A2 | 5/2007 | |
| WO | 2021198262 A1 | 10/2021 | |
| WO | 2023031460 A1 | 3/2023 | |
| WO | 2023156939 A1 | 8/2023 | |

OTHER PUBLICATIONS

Search Report in corresponding European patent application No. 22198890.0 dated May 3, 2023.

* cited by examiner

TRANSPARENT ROOF PANEL ASSEMBLY FOR A VEHICLE ROOF

BACKGROUND

The discussion below is merely provided for general background information and is not intended to be used as an aid in determining the scope of the claimed subject matter.

Aspects of the invention relate to a transparent roof panel assembly for a vehicle roof, the roof panel assembly comprising a panel having a transparent area, the panel being configured to be arranged over an opening in the vehicle roof to allow visible light to pass in a first direction through the transparent area, the first direction extending between an exterior of the vehicle and an interior of the vehicle and substantially perpendicular to a surface of the panel, a light source arranged to provide light in the panel in a second direction, an out-coupling pattern arranged on the surface of the transparent area of the panel, the out-coupling pattern is adapted to out-couple light propagating in the panel, and an in-coupling element to in-couple light into the panel from the interior side of the panel, the in-coupling element being attached to the interior side of the panel and redirecting light from the light source into the panel.

Such roof panel assembly is known from the prior art.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

According to a first embodiment, the in-coupling element is partly covered towards the interior of the vehicle, with the exception of a selected area, such that light is able to pass from the in-coupling element towards the interior through the selected area.

In this way, the in-coupling element has an additional function as a light strip visible from the interior of the vehicle.

In another embodiment, the in-coupling element is attached to the interior side of the panel by means of an adhering material accommodated in a chamber which is formed within the in-coupling element and which is open towards the panel.

Such chamber makes it easier to use a proper amount of adhering material, such as tape, glue, gel or the like in the desired position.

The chamber may be formed by spacers or e.g., by means of clamping parts attached to the interior side of the panel and holding the in-coupling element with respect to the panel at least before the adhering material is introduced into the chamber.

In a further embodiment, the in-coupling element is formed directly to the interior side of the panel, either extruded directly on the interior side of the panel or molded directly to the interior side of the panel.

This has the advantage of light being guided directly into the panel without borders that may influence the light transmission. Also, one or more assembly steps can be avoided by this embodiment.

In a further embodiment, the in-coupling element is provided with an integral extension at the side of the light source and the light source being attached onto this extension of the in-coupling element.

In this way a pre-assembled functional light module is formed that can be fixed to the panel in one step.

The extension may be formed to the in-coupling element either at a position adjacent to the interior side of the panel or at a distance from the interior side of the panel in which case the light source is attached to a side of the extension facing the interior side of the panel.

The in-coupling element may be provided with positioning members to position the light source with respect to the in-coupling element.

This facilitates assembly and improves the positioning accuracy of the light source with respect to the in-coupling element.

The in-coupling element may be provided with a cover on its side facing the interior of the vehicle, the cover being attached, clipped or taped to the in-coupling element and/or to the interior side of the panel such that also the light source is covered to protect it from view from the interior of the vehicle and/or against moisture.

The in-coupling element and/or the light source may be attached to the cover, for example, the cover may be molded or clipped to the in-coupling element and/or to the light source.

In a particular embodiment, the in-coupling element is divided in its length direction in segments positioned side-by-side such that they are able to move with respect to each other when the panel expands or shrinks in a different manner relative to the in-coupling element due to different thermal expansion coefficients.

An aspect of the invention also includes a method of attaching a transparent light transmitting element (for example an in-coupling element) to a glass ply of a transparent roof panel assembly. It comprises the steps of providing the light transmitting element comprising a side having a shape to fit precisely onto the surface of the glass ply, the side being provided with a recess over the majority of its surface and the opposite side of the light transmitting element being provided with a through-hole to the recess, and allowing adhering fluid to enter the recess through the through-hole, the height of the recess being such that the adhering fluid will fill the complete recess due to capillary forces on the fluid within the recess, air being allowed to escape from the recess towards the outside of the in-coupling element.

BRIEF DESCRIPTION OF THE DRAWINGS

Further details and advantages of aspects of the invention will become clear from the following description with reference to the drawings showing embodiments of the roof panel assembly.

DETAILED DESCRIPTION OF THE ILLUSTRATIVE EMBODIMENTS

Figure 1:
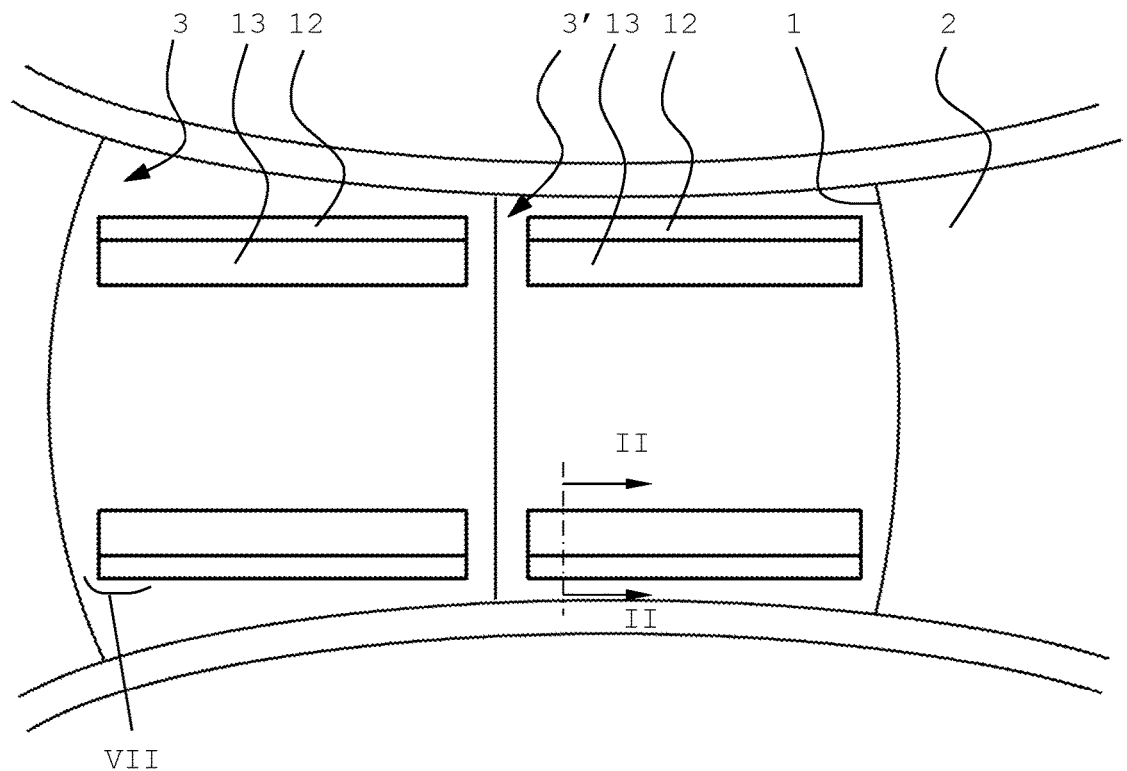
FIG. 1 is a very schematic plan view of a vehicle roof comprising the roof panel assembly.

FIG. 1 shows a part of a vehicle, in this case a passenger car, comprising a glass roof construction. The vehicle comprises a roof opening 1 in a fixed roof 2. In this case the open roof construction has a roof panel assembly including two panels 3, 3' placed adjacent to each other in a longitudinal direction of the vehicle. The frontal of the two panels 3, 3' is an openable panel 3 capable of closing and at least partly opening the roof opening 1 of the fixed roof 2. The second panel 3' placed rearward of the front panel 3 may be a stationary panel closing the remaining part of the roof opening 1, however it is also conceivable that also the second panel 3' is a movable panel. Alternatively, it is also conceivable to have just one panel, either fixed or capable of closing and at least partly opening the roof opening 1.

Figure 2:
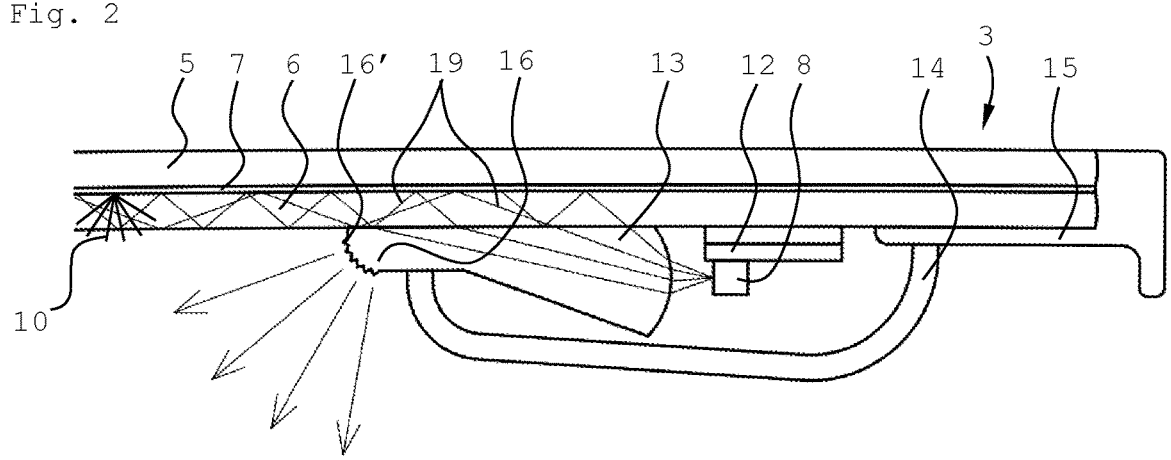
FIG. 2 is an enlarged sectional view according to the line II-II in FIG. 1.

FIG. 2 shows a partial cross-section of a multi-layered panel 3 of the glass roof panel assembly according to FIG. 1, wherein an exterior glass ply 5 and an interior glass ply 6 are attached by an interlayer 7 and optionally a second interlayer (not shown). For example, the interlayer 7 may be formed of EVA or PVB. Other materials to form a flexible foil are known and suitable as well as long as the refractive index of the interlayer 7 is lower than that of the interior glass ply 6 if one wishes to keep any light within the glass ply. For example, glass has a reflective index of 1.52, EVA and PVB of 1.48.

At a lower side of the interior or first glass ply 5, a light source 8 is provided. The light source 8 may be any light source suitable for coupling light 9 into the interior glass ply 6. For example, known light sources are LED's directing light directly into lower side of the interior glass ply 6 or, alternatively or additionally, an elongated, side-emitting light guide arranged next to the lower side of the interior glass ply 6.

An out-coupling pattern is provided at a surface of the interior glass ply 6. In particular, the out-coupling pattern is arranged at an interface between the interior glass ply 6 and the interlayer 7. The interior glass ply 6 and the interlayer 7 are adjacent to each other, which means they are attached directly to each other or through the outcoupling pattern. As shown, rays of light 9 propagate through the interior glass ply 6 by internal reflection and may impinge on a scattering particle of the out-coupling pattern. Upon impingement, the ray of light 9 is at least partly reflected and reflected light rays 10 are enabled to leave the interior glass ply 6 at an opposite surface of the interior glass ply 6 and is thus emitted into an interior passenger compartment 11 of the vehicle.

Other possibilities for the out-coupling pattern exist. For example, the light may be in-coupled into the interlayer 7 which includes the out-coupling pattern. The outcoupling pattern may be provided on one of the surfaces of the interlayer 7, on the interior glass ply 6 or randomly scattered within the interlayer 7.

The light source 8 in this case is provided with a base 12 that is attached to the interior side of the interior glass ply. A polyhedron-, e.g. prism-shaped, in-coupling element 13 is provided in front of the light source 8 to in-couple light into the panel from the interior side of the panel. The in-coupling element 13 is made of e.g., polycarbonate, glass or another transparent, optically clear material which is able to redirect the light from the light source 8 into the interior glass ply 6 of the panel 3. Preferably, a material is used having a refractive index which is equal to or higher than that of the interior glass ply 6 to reduce the size of the optical in-coupling element 13 and maximize the efficiency. The entrance of the in-coupling element 13, i.e., the part facing the light source 8 may be lens shaped, either 2D or even 3D to "bundle" the light already in the correct direction (towards the glass at a desired angle) to improve efficiency. An additional reflection lens may be provided to reflect light arrays that would otherwise be lost into the correct direction (e.g., parallel to the inclined surface of the in-coupling element). Such lens may also be mounted onto the light source, such as a LED. The lens shape may also be such that light from the light source 8 can be directed downwardly from the panel 3 (top-emitting LEDs can be used then instead of side-emitting LEDs). An additional reflection surface is needed then to direct the light from the downward direction to a direction parallel to the inclined surface of the in-coupling element.

In this embodiment, the in-coupling element 13 is partly covered towards the interior 11 of the vehicle by a cover 14. This cover 14 covers the light source 8 with its base 12 and connects to a moulding 15 covering an edge portion of the panel 3. The cover 14 also covers the in-coupling element 13, with the exception of a selected area 16, such that light is able to pass directly from the in-coupling element 13 towards the interior 11 of the vehicle through the selected area 16. The shape of the in-coupling element 13 is adapted to this additional function including a flat portion onto which an edge of the cover 14 engages and a rounded end as the exposed area 16 where the light may be spread evenly toward the interior 11 of the vehicle. To better out-couple the light from this area 16, the in-coupling element 13 is provided with a graining 16' on its surface in the area 16.

The in-coupling element 13 is attached to the interior side of interior glass ply 6 of the panel 3.

Figure 3A:
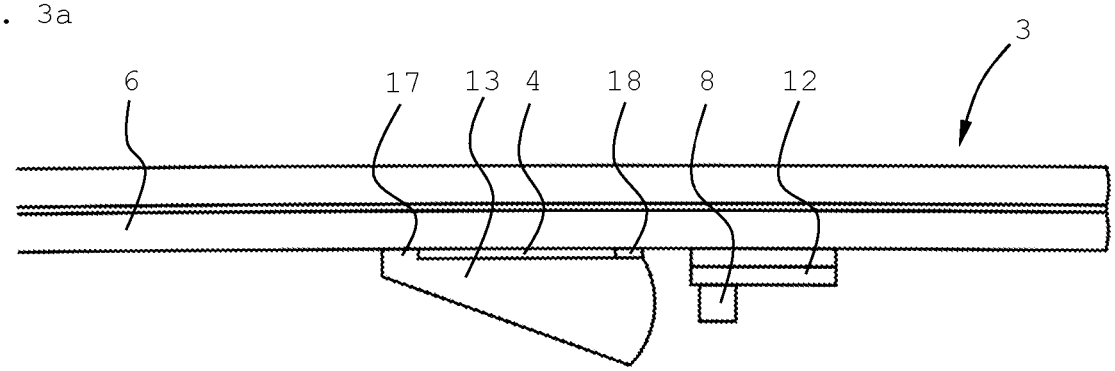
FIGS. 3*a*, *b*, *c*, 4, 5*a*, *b* and 6*a*, *b*, *c* are views similar to that of FIG. 2 but showing different embodiments of the roof panel assembly.

FIG. 3a shows a second embodiment related to the manner of attachment of the in-coupling element 13 to the interior side of the panel 3. The side of the in-coupling element 13 facing the panel 3 is substantially parallel to the internal glass ply 6 whether it is straight or curved in one or two directions. The in-coupling element 13 is provided on its side facing the panel 3 with two spacers: one spacer strip 17 integrated in the in-coupling element 13 and a gluing spacer strip 18 fixed between the in-coupling element 13 and the interior side of the panel 3 at the side of the in-coupling element spaced opposite to the spacer strip 17. In this way there is formed a gluing chamber 4 between the in-coupling element 13 and the interior side of the panel 3 defined by the spacer strips 17 and 18. The gluing chamber 4 can be filled beforehand by a gluing tape or a glue bead, or, when already in position on the panel 3, can be injected with glue or gel, or be filled through a capillary process, depending on the viscosity of the fluid. Vacuum may be used (in an autoclave) to extract air bubbles from the glue for better light transmission. To cure the glue, climate or UV-light may be used, or a two-component glue can be used to activate it. It is preferred to use a glue (or other intermediate means of attachment) that has a refractive index that is close to and preferably higher than that of glass, i.e., 1.52 for an optimal light transmission to the interior glass ply 6. Due to the glue, the surface of the in-coupling element 13 does not have to match exactly with the interior surface of the interior glass ply 6, as the glue will create a deformable/adjustable layer between the surfaces.

Figure 3B:
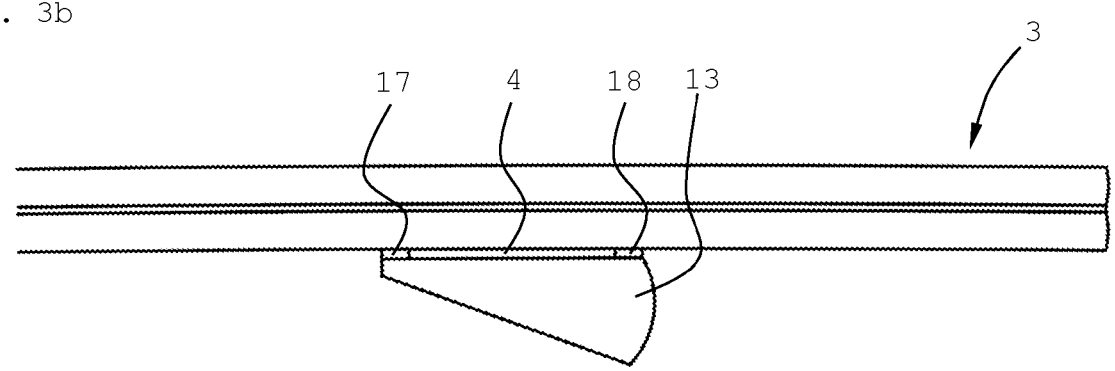

FIG. 3b shows a variation of the embodiment of FIG. 3a, in which the integrated spacer strip 17 is replaced by a separate spacer strip similar to the spacer strip 18. These spacer strips 17, 18 can be formed by fixation tape, which is particularly useful if a gel is used in the gluing chamber 4 to fix the in-coupling element 13 to the panel 3 which has a lower holding power than glue.

Alternatively, an optical pressure sensitive adhesive tape can be used. Such tapes provide immediate fixation (some tape need (UV) curing to achieve final properties). Also an interlayer material can be used to fix the optical in-coupling element 13 (such as EVA, PVB, TPU). In combination with the required refractive index TPU is preferred. Such interlayer materials require a temperature/heat treatment to achieve the fixation. The joining with tapes or interlayers is preferably done in a vacuum environment (potentially with additional exterior pressure) to avoid air entrapment.

Figure 3C:
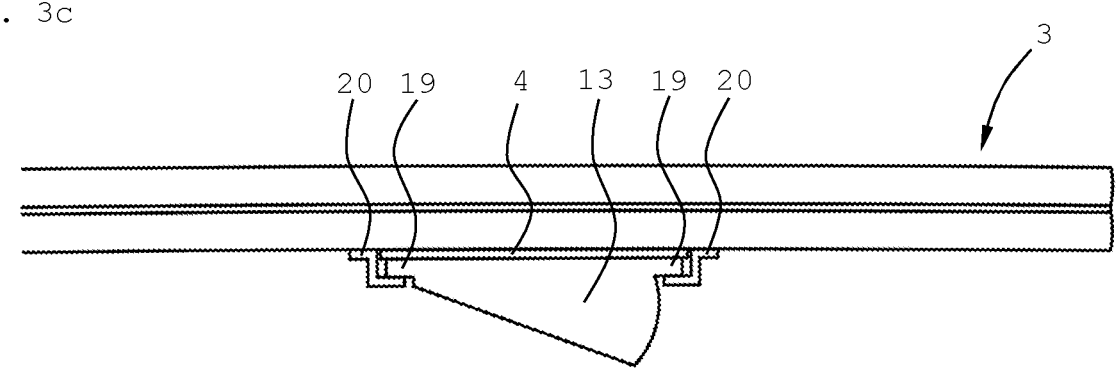

FIG. 3c shows another variant in which the in-coupling element 13 comprises shoulders 19 and clamping profiles 20 to hold the in-coupling element 13 before, during and after filling the glue chamber 4 with a glue or gel. The clamping profiles 20 are attached to the panel 3 but may allow some thermal expansion of the in-coupling element 13 if this is different from that of the panel 3.

Figure 4:
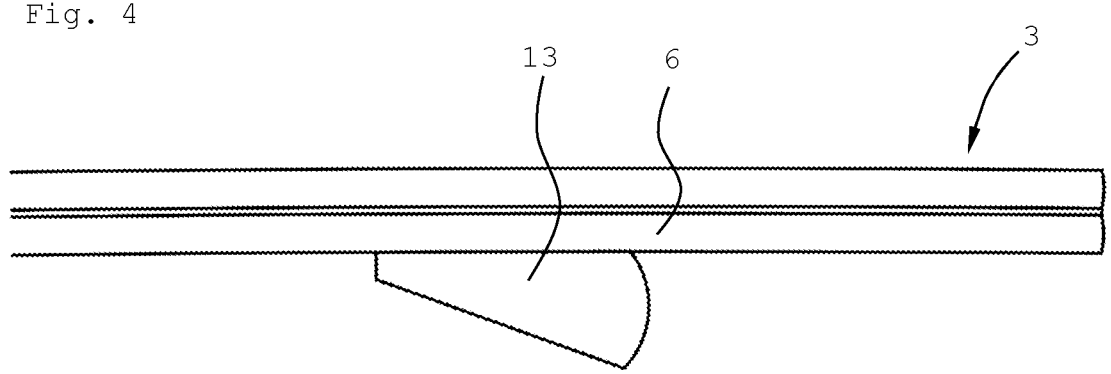

The embodiment of FIG. 4 has an in-coupling element 13 that is integrated in the interior glass ply 6 of the panel 3, either by being directly extruded on the glass ply 6 or by being molded on the interior side of the interior glass ply 6.

Figure 5A:
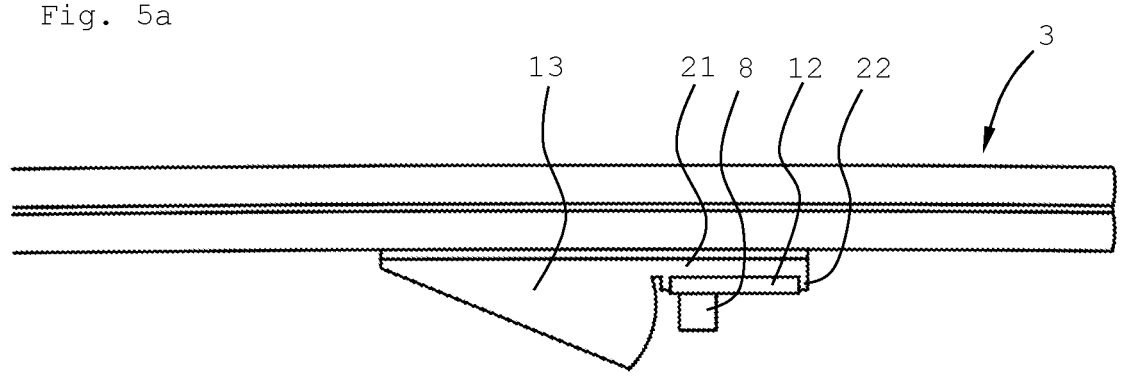

FIG. 5a shows an embodiment in which the light source 8 with its base 12 is not attached to the panel 3 directly but through the in-coupling element 13. For this purpose, the in-coupling element 13 comprises an integral extension 21, in one embodiment formed from a single unitary body of the in-coupling element 13, and the base 12 of the light source 8 is mounted onto this extension 21. The extension is thus formed in one piece with the in-coupling element and connects to the remainder of the in-coupling element at a position adjacent the panel, so that the attachment of the in-coupling element 13 to the panel 3 also takes place at the position of the extension 21, for example by an adhering tape or layer. The extension 21 may be provided with a recess 22 into which the base 12 fits so that the positioning of the light source 8 is facilitated and/or improved. This mounting of the light source to the in-coupling element 13 creates a pre-assembled functional light module and avoids glue access from the sides of the in-coupling element towards the critical light source/lens area.

Figure 5B:
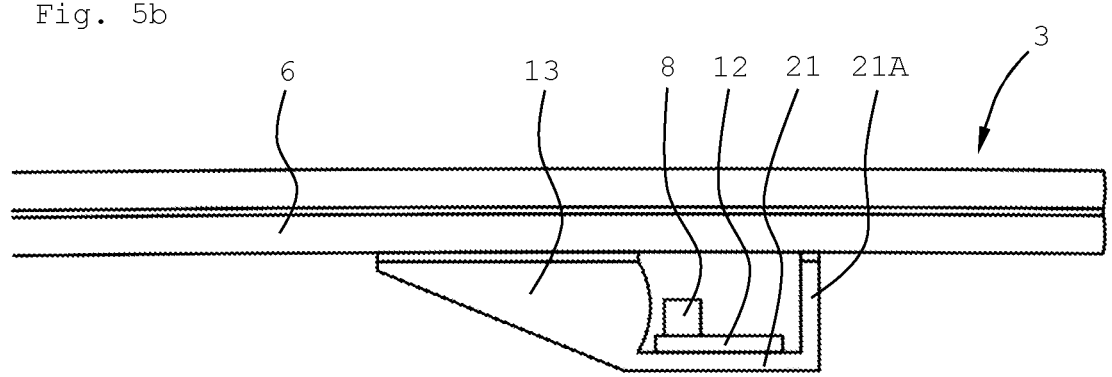

FIG. 5b shows another embodiment in which the light source 8 is mounted to the in-coupling element 13. In this case the extension 21 connects to the remainder of the in-coupling element 13 at a position spaced from the panel 3. However, the extension 21 is provided with a leg 21A extending towards the panel 3 and the free end of which can be attached to the interior side of the interior glass ply 6. The light source 8 and its base 12 are now in an upside-down orientation with respect to that of FIG. 5a, so that the light source 8 is attached to the side of the extension 21 facing the panel 3. In this position, it is covered by the extension 21, 21A of the in-coupling element 13.

Figure 6A:
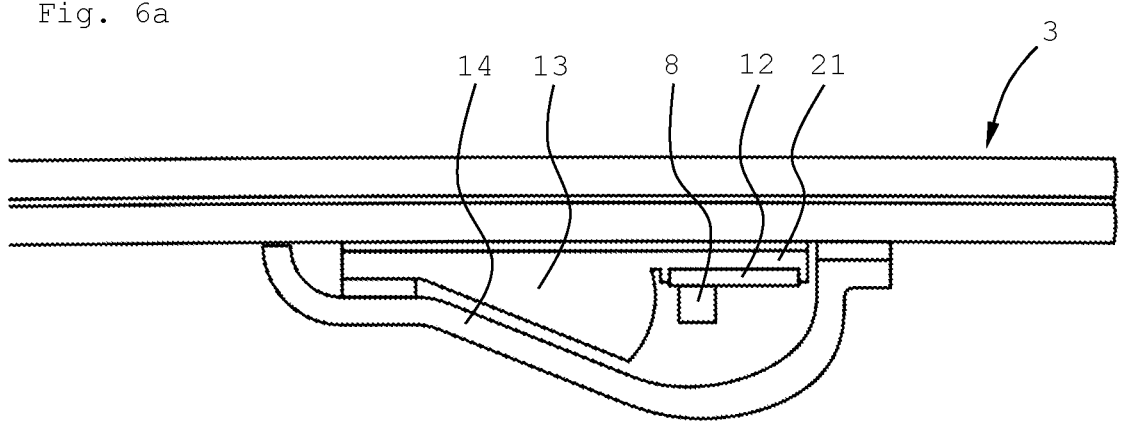

FIG. 6a shows a variation of the FIG. 5a embodiment in which the in-coupling element 13 and the light source 8 are covered by another form of the cover 14. The cover 14 covers both the in-coupling element 13 and the light source 8 completely so as to prevent the bleeding of light from this area and to protect the light source 8 against mechanical damage and moisture. In this case, the cover 14 is attached on one side to the panel 3 and on the other side to the in-coupling element 13. Of course, it would also be possible to attach the cover 14 at both sides to the panel 3. The cover 14 could e.g., be taped or clipped to the in-coupling element 13 and/or panel 3.

Figure 6B:
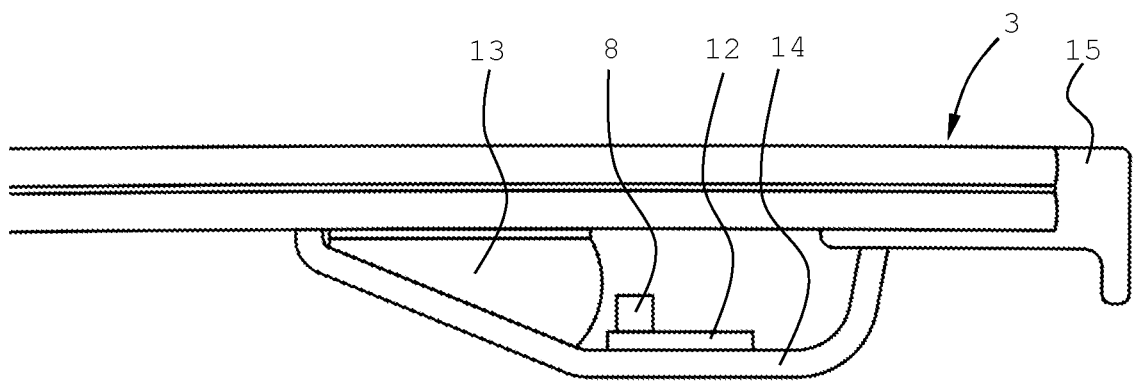

FIG. 6b shows a variation of the FIG. 6a embodiment in which the cover 14 is precisely attached to the in-coupling element 13 and the base 12 of the light source 8 is attached to the side of the cover 14 facing the panel 3. Positioning elements may be provided to position the cover 14 with respect to the in-coupling element 13 and the light source 8. The in-coupling element 13 may be over-molded by the cover 14 or be clipped to it. Other means of fixation are conceivable of course. The in-coupling element 13 is also fixed to the panel 3, for example in a manner already described before.

Figure 6C:
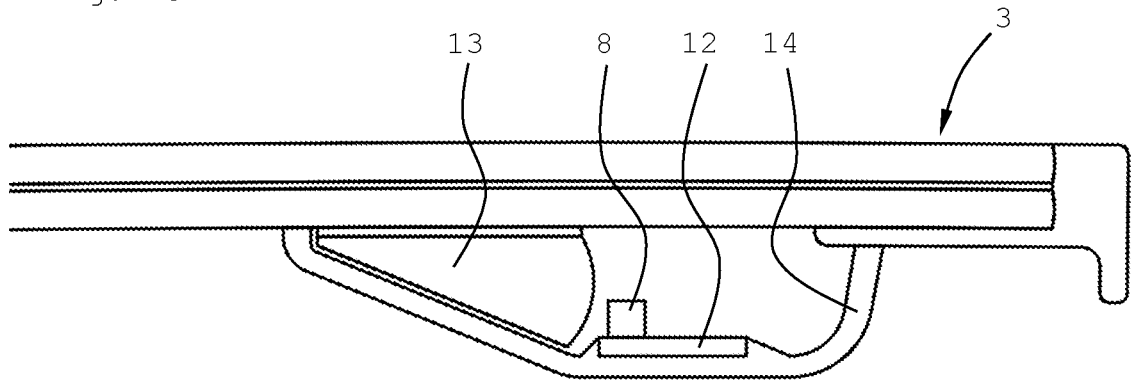

In the FIG. 6c embodiment, also the base 12 of the light source 8 is over-molded by or clipped to the cover 14. The cover 14 may or may not be molded or clipped to the in-coupling element 13.

FIGS. 7a-7d show embodiments that are devised to avoid possible risks resulting from a difference in thermal expansion coefficients of the in-coupling element 13 and glass panel 3.

Figure 7A:
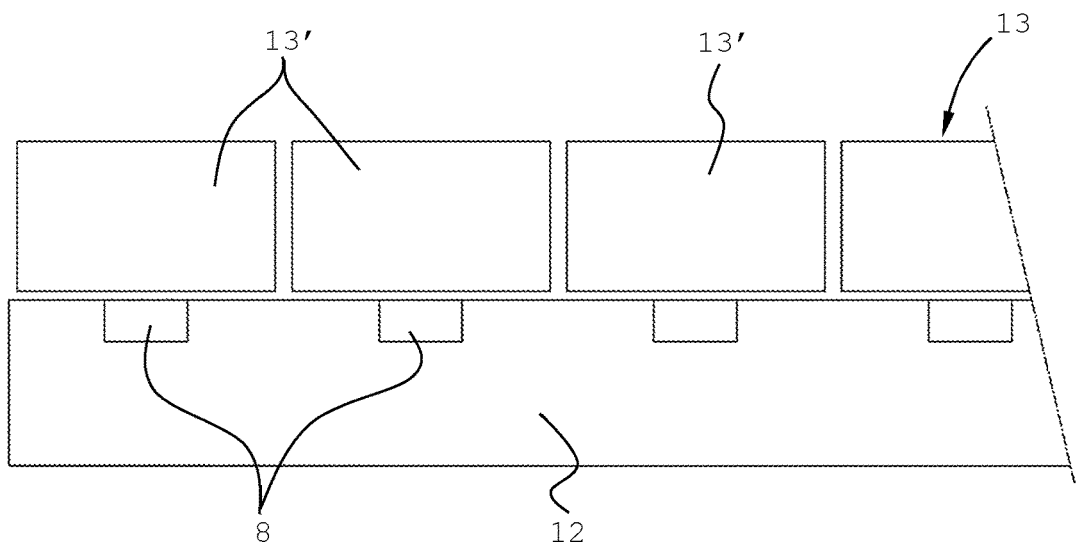
FIGS. 7*a*, *b*, *c* and *d* show detail VII in FIG. 1, but depicting different embodiments.

In FIG. 7a, the in-coupling element 13 is separated along its length into segments 13' placed side-by-side. Each segment 13' has one light source 8 cooperating with it in case of separate light sources such as LEDs. In case of a continuous light source, such as a light guide, the segments 13' could be designed as desired by the relevant thermal expansion coefficients.

Figure 7B:
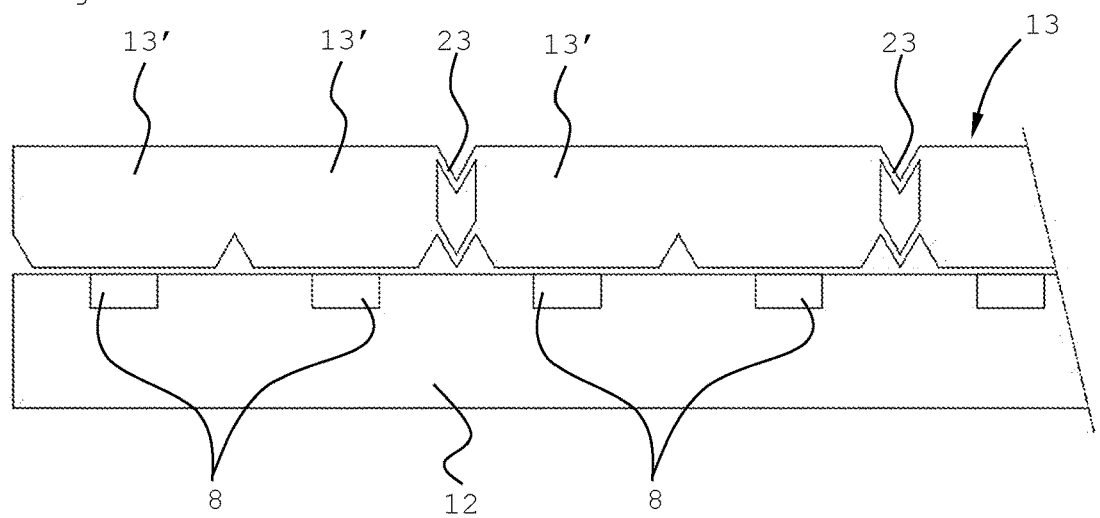

In FIG. 7b, the separate segments 13' are fixedly coupled for each two light sources 8 and each two segments 13' are interconnected by a flexible connection 23. The flexible connections 23 could be integrated within the in-coupling element or could be separate connections attached to the relevant segments 13' of the in-coupling element 13.

Figure 7C:
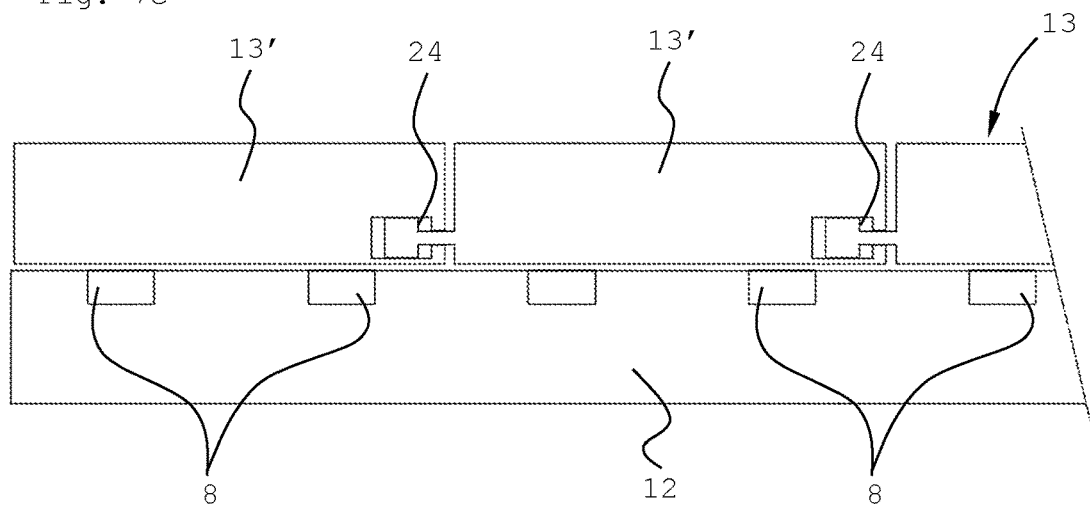

The FIG. 7c embodiment has coupling elements 24 that couple adjacent segments 13' of the in-coupling element 13 with play, so that the coupled adjacent segments 13' can make a slight relative movement upon temperature increases or decrease.

Figure 7D:
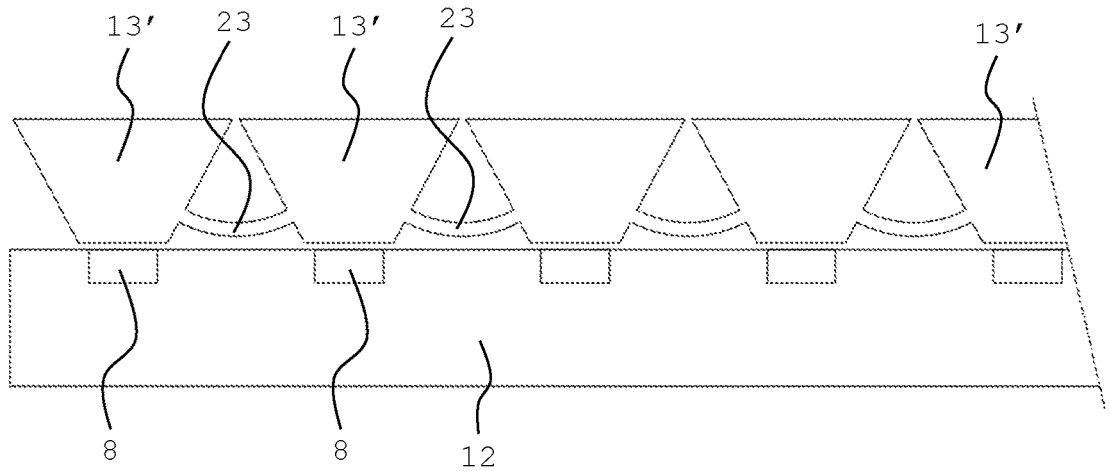

FIG. 7d shows an embodiment in which the segments 13' are shaped to adapt to the light cone of the respective light sources 8, such that also upon a slight movement of the segments 13' upon a temperature change an obstruction of the light cone is avoided.

Figure 8:
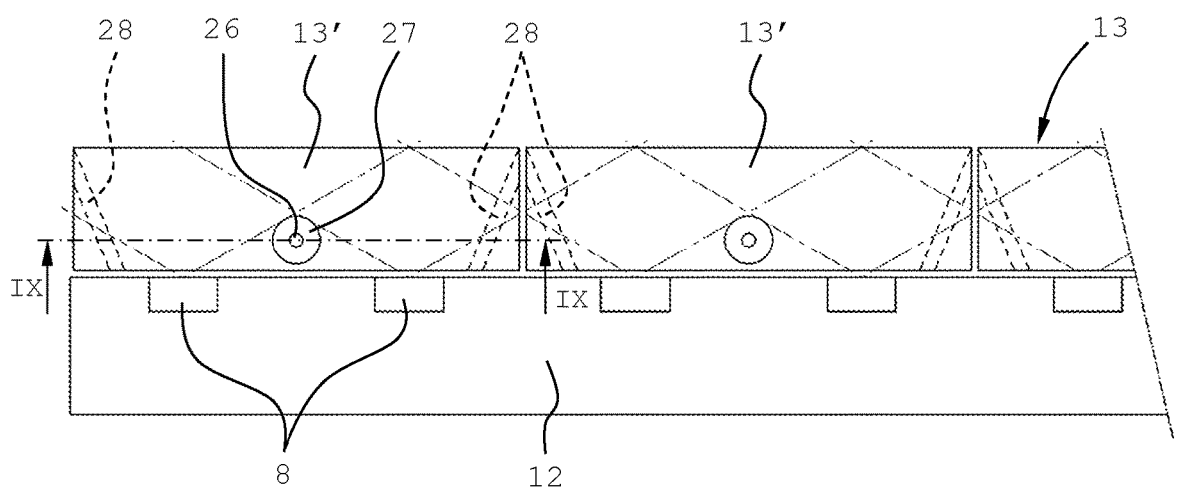
FIG. 8 is a view similar to that of FIG. 7 but showing a further embodiment.
Figure 9:
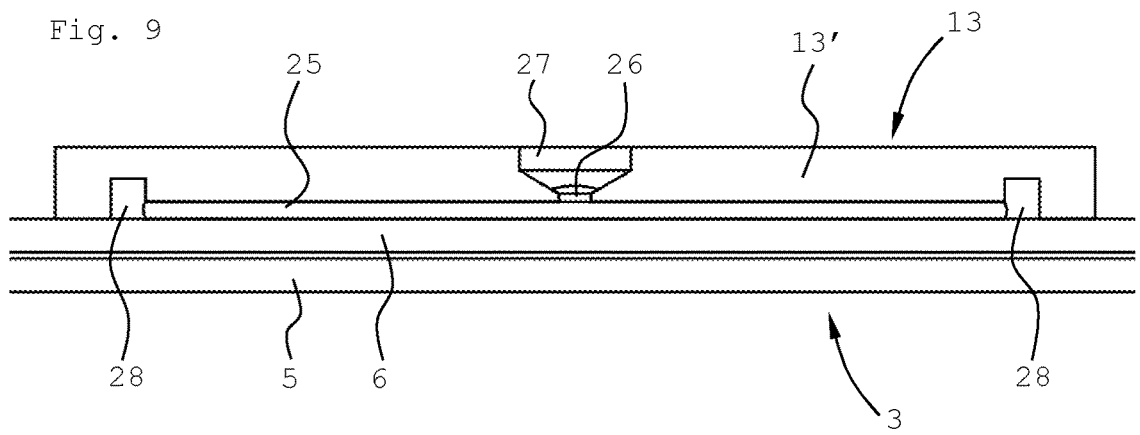
FIG. 9 is an enlarged sectional view along the line IX-IX in FIG. 8.

FIGS. 8 and 9 show another embodiment of the roof panel assembly. One recognizes the segments 13' of the in-coupling element 13 and the light sources 8 on their base 12. FIG. 9 shows that the segment 13' of the in-coupling element 13 is provided on its side facing the glass ply 6 of the panel 3 with a recess 25. The height of the recess 25 is very small, e.g., in the range of 0.1-0.3 mm. The recess 25 extends over the majority of the surface area of the respective side of the segment 13'. The side of the segment 13' facing away from the panel 3 is provided with a through-hole 26 having a funnel-shaped entrance 27. The recess 25 is bounded on the short sides of the segment 13' by a groove 28 having a height which is greater than the height of the recess 25. FIG. 8 shows that the grooves 28 are inclined in plan-view and communicate with the outside of the segment 13'.

If an adhering fluid is allowed to enter the recess 25 through the through-hole 26, capillary forces in the recess 25 will force the fluid to fill the entire recess 25 up to the grooves 28 where no capillary forces are created due to the greater height. The capillary forces will keep the fluid within the recess 25, only air is allowed to exit through the grooves 28. The adhering fluid (glue, gel or the like) will then be cured to fix the segment 13' to the interior glass ply of the panel 3. The height of the recess 25 will be adapted to the viscosity of the adhering fluid used. The height may vary, e.g., from 0.1-0.7 mm. A height of 0.2 mm works fine with various glues.

It is clear from the above description that aspects of the invention provide a roof panel assembly in which the panel is lighted by light sources and in-coupling elements that have favourable characteristics, such as versatility, easy and precise attachment, efficient light transmission, easy assembly and others.

Detailed embodiments of the present invention are disclosed herein, however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in expectedly any appropriately detailed structure. In particular, features presented and described in separate dependent claims or in separate embodiments may be applied in combination and any advantageous combination of such claims and embodiments are herewith disclosed.

Further, the terms and phrases used herein are not intended to be limiting, but rather to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described it is apparent that the same may be varied in many ways. Such variations are not to be regarded as a departure from the spirit and scope of the invention, and all such modifications as would be apparent to one skilled in the art are intended to be included within the scope of the following claims.

For example, it is possible to replace one or more glass plies in the roof panel assembly by a plastic sheet, for example a polycarbonate sheet. The invention is also useful in panels having only a single ply.

What is claimed is:

1. A transparent roof panel assembly for a vehicle roof of a vehicle, the transparent roof panel assembly comprising:
   a panel being configured to be arranged over an opening in the vehicle roof, the panel comprising:
   an exterior ply;
   an interior ply having a first refractive index; and
   an interlayer between the exterior ply and the interior ply, the interlayer having a second refractive index wherein the second refractive index is lower than the first refractive index, wherein the panel has a transparent area to allow visible light to pass through the transparent area between an exterior of the vehicle and an interior of the vehicle,
   a light source arranged to provide light in the panel, and
   an in-coupling element to in-couple light into the panel from an interior side of the interior ply, the in-coupling element being attached to the interior side of the interior ply and redirecting light from the light source into the interior ply,
   wherein the in-coupling element is formed directly to the interior side of the interior ply, either extruded directly on the interior side of the interior ply or molded directly to the interior side of the interior ply.

2. The transparent roof panel assembly of claim 1, wherein the in-coupling element is partly covered towards the interior of the vehicle, with an exception of a selected area, such that light is able to pass from the in-coupling element towards the interior through the selected area.

3. The transparent roof panel assembly of claim 1, wherein the in-coupling element is provided with an integral extension at a side of the light source and the light source being attached onto this extension of the in-coupling element.

4. The transparent roof panel assembly of claim 3, wherein the extension is formed to the in-coupling element at a distance from the interior side of the panel such that the light source is attached to a side of the extension facing the interior side of the panel.

5. The transparent roof panel assembly of claim 3, wherein the in-coupling element is provided with positioning members to position the light source with respect to the in-coupling element.

6. The transparent roof panel assembly of claim 1, wherein the in-coupling element is provided with a cover on its side facing the interior of the vehicle, the cover being attached to the in-coupling element and/or to the interior side of the panel such that also the light source is covered to protect it from view from the interior of the vehicle.

7. The transparent roof panel assembly of claim 6, wherein the in-coupling element and/or the light source is attached to the cover.

8. The transparent roof panel assembly of claim 7, wherein the cover is molded or clipped to the in-coupling element and/or to the light source.

9. The transparent roof panel assembly of claim 1, wherein the light source is positioned such with respect to the in-coupling element that the light source emits light into the in-coupling element in a desired direction generally between parallel to the panel and parallel to an outer wall of the in-coupling element.

10. The transparent roof panel assembly of claim 9, comprising a reflection surface redirecting the light from the light source in the desired direction into the in-coupling element.

11. A transparent roof panel assembly for a vehicle roof of a vehicle, the transparent roof panel assembly comprising
   a panel having a transparent area, the panel being configured to be arranged over an opening in the vehicle roof to allow visible light to pass through the transparent area between an exterior of the vehicle and an interior of the vehicle,
   at least one light source arranged to provide light in the panel, and
   an in-coupling element to in-couple light into the panel from an interior side of the panel, the in-coupling element being attached to the interior side of the panel and redirecting light from the at least one light source into the panel,
   wherein the in-coupling element is divided in its length direction in segments positioned side-by-side on the same panel such that they are able to move with respect to each other when the panel expands or shrinks due to temperature changes.

12. The transparent roof panel assembly of claim 11, wherein the segments of the in-coupling element are connected to each other by flexible area's formed in one piece with the segments, or are coupled to each other through coupling members allowing limited movement between the segments.

13. The transparent roof panel assembly of claim 11, wherein the segments of the in-coupling element are cone-shaped adapted to the cone-shape of the light of the at least one light source.

14. The transparent roof panel assembly of claim 11, wherein the at least one light source is positioned such with respect to the in-coupling element that the at least one light source emits light into the in-coupling element in a desired direction generally between parallel to the panel and parallel to an outer wall of the in-coupling element.

15. The transparent roof panel assembly of claim 14, comprising a reflection surface redirecting the light from the at least one light source in the desired direction into the in-coupling element.

16. The transparent roof panel assembly of claim 11, wherein the at least one light source comprises a plurality of light sources, and wherein each segment of the in-coupling element has its own light source.

\* \* \* \* \*